Aug. 16, 1927.  1,639,168
C. DOROZYNSKI
ROASTING OVEN
Filed Sept. 15, 1926   2 Sheets-Sheet 2
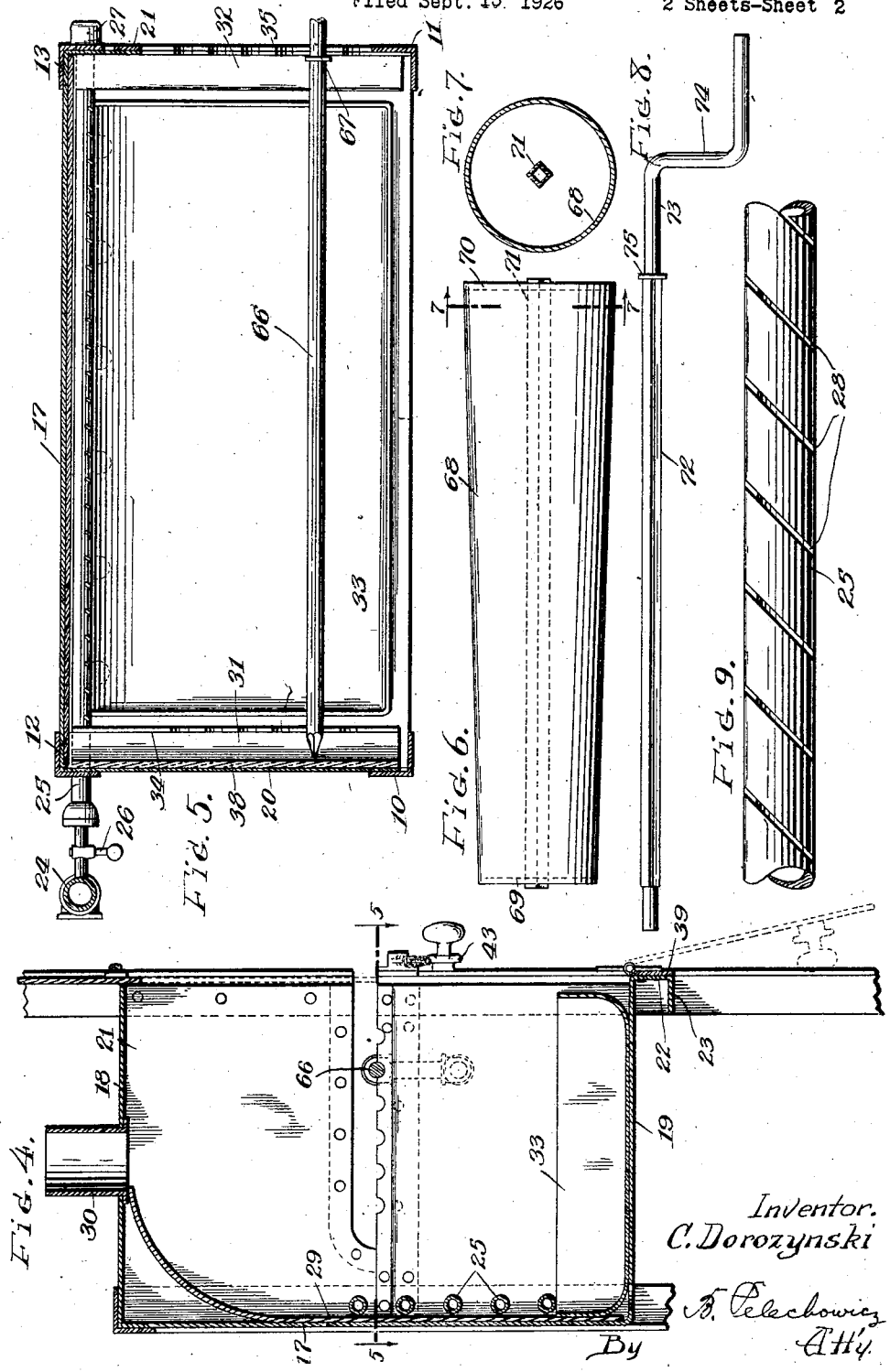
Inventor.
C. Dorozynski Patented Aug. 16, 1927.

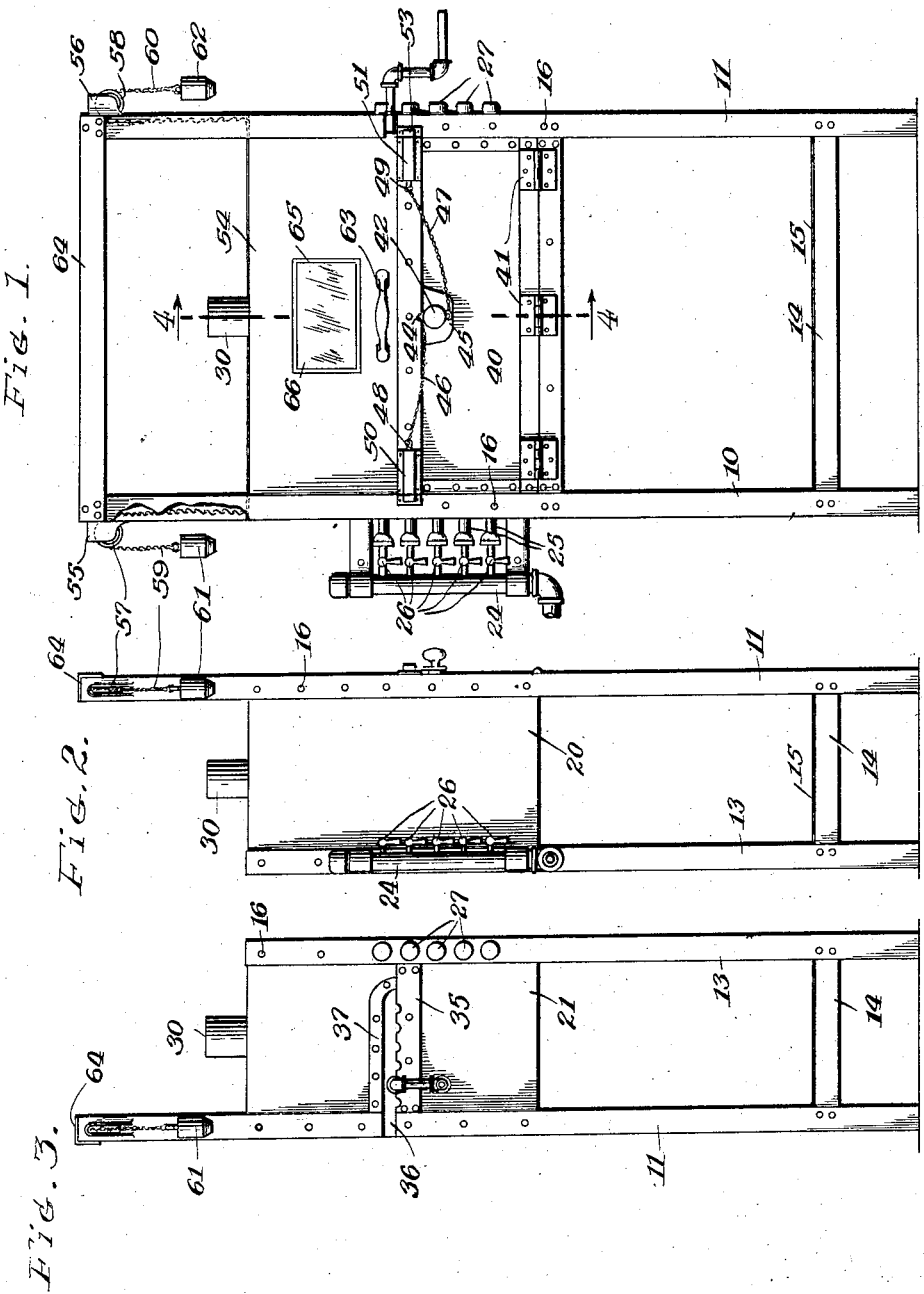

1,639,168

UNITED STATES PATENT OFFICE.

CASIMIR DOROZYNSKI, OF CHICAGO, ILLINOIS.

ROASTING OVEN.

Application filed September 15, 1926. Serial No. 135,513.

The object of the present invention is the provision of a roasting oven which is simple in construction and which can be easily manufactured.

Another object is the provision of an oven for roasting meat, baking cakes, etc., adapted for being heated by gas.

Another object of the invention is the provision of an oven having a roasting chamber which is provided with doors adapted for quick opening for providing access to the heating chamber.

Another object of the invention is the provision of an oven wherein the food may be roasted by being attached to a revolving rod or drum.

With the above general objects in view and others that will appear as the nature of the invention is better understood, the same consists in the novel construction, combination and arangement of parts hereinafter more fully described, illustrated in the accompanying drawings and pointed out in the appended claims.

In the drawings forming a part of this application and in which like designating characters refer to corresponding parts throughout the several views, Fig. 1 is the front elevational view of the oven;

Fig. 2 is the side elevational view of the oven;

Fig. 3 is the elevation of the other side of the oven;

Fig. 4 is a side cross-sectional view through the oven taken on line 4—4 of Fig. 1;

Fig. 5 is a horizontal cross-sectional view on line 5—5 of Fig. 4;

Fig. 6 is the elevational view of modified means for attaching food which is to be roasted;

Fig. 7 is the cross-sectional view of said means taken on line 7—7 of Fig. 6;

Fig. 8 is a cooperating part for rotating the above stated means; and

Fig. 9 is the elevation of a portion of gas pipe in the oven.

Referring to the drawings in detail there is shown therein a pair of front legs 10 and 11 and a pair of rear legs 12 and 13. Said legs are joined adjacent their lower ends by a number of braces 14 which suport a shelf 15. Each of said legs is longitudinally bent assuming L-shaped formation on horizontal cross-section, as is clearly shown on Fig. 5.

The roasting chamber is positioned within said legs and is attached thereto by any suitable means such as rivets 16. Said roasting chamber comprises a rear wall 17, top wall 18, bottom wall 19 and two side walls 20 and 21. Preferably said top wall 18 and the bottom wall 19 may be integrally formed with the rear wall 17, as is shown on Fig. 4, while the side walls 20 and 21 may be formed integrally with either top wall 18 or bottom wall 19. Thus said roasting chamber will present a box-like structure which may be stamped or formed by suitable machine in substantially one operation. The bottom wall 19 at its front edge has an integrally formed downwardly depending flange 22 for the purpose hereinafter stated. Said flange is bent rearwardly for forming a longitudinal flange or brace 23 for the purpose of joining front legs 10 and 11 and for strengthening the structure.

Gas is supplied to the heating chamber through the medium of manifold 24 which is positioned adjacent side 20 of said heating chamber and near its rear edge. A plurality of pipes 25 connect with said manifold and have valves 26 for permitting the flow of the gas to said pipes 25 or for shutting off the gas. Said pipes extend through leg 12 and pass transversely of the roasting chamber, being positioned adjacent the rear wall 17, and their outer ends pass through leg 13, their outer ends being sealed by caps 27. Each pipe 25 has a plurality of incisions or notches 28 through which the gas is permitted to flow and burn. Interposed between the rear wall 17, and said pipes 25 is a baffle plate 29 deflecting the combustion gases and cooking odors to vent 30 provided at the top wall 18. Said vent may be connected by suitable pipes with the chimney.

Adjacent the lower portions of sides 20 and 21 housings 31 and 32 are provided, having for their general purpose to provide insulation against the heating affecting said sides, and also for limiting the longitudinal shifting movements of the drip pan 33 positioned upon the bottom wall 19. Said drip pan 33 collects the juices which are usually generated from meat or other food when under the influence of high temperature. Said housings 31 and 32 are in any suitable manner attached to the adjacent walls of the roasting chamber. Housing 31 carries a rack bar 34, and a similar rack bar 35 is provided in wall 21 for the purposes hereinafter described. Immediately above said rack bar 35, transverse slot 36 is made in the leg 11 and in the side wall 21, and in order to strengthen said side wall 21 a strengthening rib or plate 37 is riveted or otherwise suitably mounted upon the edge of said side wall 21 adjacent said slot or opening 36.

If preferred the roasting chamber may be lined with asbestos and one such lining is shown on Fig. 5 adjacent wall 21 and indicated by numeral 38.

Flange 22, at its front face carries a strengthening plate 39 which remains flush with the forward front faces of legs 10 and 11. Swinging door 40 is pivotally connected to said flange 22 and plate 39 by means of hinges 41. Adjacent the upper edge of door 40 and centrally thereof said door is provided with knob 42 having stem 43 which rotates with the knob. Said stem is provided with pins 44 and 45, both said pins being on a diametrically opposite line, and have attached thereto the inner ends of chains 46 and 47, respectively. The outer ends of said chains are connected to the inner ends of latch bolts 48 and 49, respectively. Said bolts 48 and 49 remain within latch casings 50 and 51 and are normally at pressure by springs within said latch casings 50 and 51 for the purpose of causing the engagement of the outer end of said bolts 48 and 49 with the latch catches 52 and 53, for maintaining the door 40 in locked position in respect of the roasting chamber. For opening said door 40 knob 42 is manually rotated, when pins 44 and 45 exert a pulling force upon their respective chains 46 and 47 for bringing bolts 48 and 49 out of engagement with catches 52 and 53. When said door 40 is open it remains suspended upon hinges 41 as shown by dotted lines on Fig. 4.

As illustrated in the drawings said door 40 is adapted to cover substantially the lower half of the roasting chamber. The upper portion of said roasting chamber is covered by sliding door 54 which is adapted for upward and downward sliding movement within the edges of legs 10 and 11. The upper ends of said legs 10 and 11 are provided with casings 55 and 56 within which pulleys 57 and 58 are rotatably positioned. Chains 59 and 60 are passed through pulleys 57 and 58, and by their one ends are attached to the upper corners of the sliding door 54, and at their outer ends carry weights 61 and 62. Said door 54 is provided with handle 63 by means of which said door 54 is manually pushed up or down for opening or closing said roasting chamber, as the case may be. As is clearly shown on Figs. 1, 2 and 3 the front legs 10 and 11 extend above the roasting chamber for providing guiding means for said sliding door 54. The upper ends of said front legs 10 and 11 are joined by brace 64, strengthening the upper ends of said legs and also for providing the upward movement limiting means for said door 54.

From the hereinabove made description it will be seen that the opening of doors 40 and 54 may be almost instantaneous, by opening the locking means in the door 40 by actuating knob 42, while by the other hand raising door 54 by exerting an upward pull upon handle 63. Door 54 is further provided with central opening 65 covered with mica or any other suitable material, for providing sight within the roasting chamber when said door 54 is closed.

Food to be roasted is pierced by roasting rod 66 and placed upon the rack bars 34 and 35 and rotated by crank handle or by any other suitable means. Said rod has a bushing or washer 67 which in the operative position of the rod remains in abutment with the rack bar 35 for preventing the longitudinal shifting movement of said rod 66.

The modified means for revolving the food to be roasted within the roasting chamber constitutes a tapered drum 68 provided with end walls 69 and 70. Longitudinally and centrally of said drum 68 runs a square tubing 71 which is affixed to the end plates 69 and 70 centrally thereof. Said square tubing 71 is adapted for receiving the square portion 72 of rotating rod 73. One of the ends of said rod 73 is provided with crank 74 by means of which said rod and the cooperating drum 68 are rotated. As is apparent said rod 73 is adapted to be placed upon racks 34 and 35, and washer 75 upon rod 73 prevents shifting movement of the rod and of the drum 68 from longitudinal shifting movement when within roasting chamber of the oven.

Said rotating chamber 68 is used for making tubular pancakes which are prepared as follows: A wet cloth is spread upon drum 68 and dough of thin consistency is poured upon said cloth and around said drum 68. When said cloth and drum 68 are completely covered with the dough the drum is rotated by means of rod handle 73 and crank handle 74 and under the influence of high temperature within the roasting chamber is baked, the cloth preventing the adherence of the dough to the drum. Due to the tapering shape of the drum the baked dough may be easily unsheathed from said drum, presenting a tapering tubular form. Any dripping dough will collect in the drip pan 33 as already specified.

While there is described herein a preferred embodiment of the present invention, it is nevertheless to be understood that minor changes may be made therein, without departing from the spirit and scope of the invention as claimed.

What I claim as new is:

1. An apparatus of the type described comprising a plurality of legs, an integral sheet metal member bent to form the vertical back wall, the horizontal, parallel and spaced top and bottom walls, and the side walls of an oven, said oven attached to the legs, an L-shaped flange formed on the edge of the bottom of the oven and attached to two of said legs to reinforce the same, housing members in the oven and spaced from the side walls to form an insulating space, a drip pan carried on the bottom and bearing at its ends against the housings to hold the pan in place, one of said housings carrying a rack bar, another rack bar carried on the opposite side wall of the oven, said housing and side wall respectively being slotted above the rack bars, a food carrying member supported between and on the rack bars, and means for heating the oven.

2. An apparatus of the type described comprising a plurality of legs formed L-shaped in cross-section and positioned to define the corners of a rectangle, an integral sheet metal member bent to form the vertical back wall, the horizontal, parallel and spaced top and bottom walls, and the side walls of an oven, said oven attached at its corners to the legs, an L-shaped flange formed on the edge of the bottom of the oven and attached to certain of the legs to reinforce the same, housing members in the oven and spaced from the side walls to from insulating spaces, a drip pan carried on the bottom and bearing at its ends against the insulating members to prevent movement of the pan, one of said housings carrying a rack bar, another rack bar on the side wall of the oven opposite the first rack bar, said housing and side wall being respectively slotted above the rack-bars, a food carrying member supported between and on said rack bars, and means for heating said oven.

3. The apparatus described in claim 1, and a plate arranged in the oven with one of its ends back of the drip pan, and the other end bent to form a cowl or baffle extending over the food supporting member and terminating at the top of the oven.

4. The apparatus described in claim 2, and certain of said L-shaped legs being formed with spaced openings receiving therewithin and supporting the means for heating the oven thereby relieving the structure of the oven of the weight of said heating means.

5. The apparatus described in claim 2, and the front pair of said L-shaped legs being arranged with the front face of the L structure slightly spaced from the edges of the side walls, and a door slidably mounted in the space between the said edges of the side walls and the front face of the structure.

In testimony whereof I affix my signature.

CASIMIR DOROZYNSKI.